United States Patent Office 3,580,845
Patented May 25, 1971

3,580,845
ACID CONTAINING ELECTROLYTIC LIQUID FOR AN ELECTROLYTIC CAPACITOR
Hildegard Dahle, Herborn, Germany, assignor to U.S. Philips Corporation, New York, N.Y.
No Drawing. Filed Aug. 22, 1969, Ser. No. 852,449
Claims priority, application Germany, Aug. 22, 1968, P 17 64 869.0
Int. Cl. H01g 9/00
U.S. Cl. 252—62.2      4 Claims

ABSTRACT OF THE DISCLOSURE

The invention relates to a low-resistive electrolyte liquid for an electrolytic capacitor which liquid consists of a mixture of a multivalent alcohol in water as a solvent, a basic nitrogen compound, two inorganic acids and one organic acid and/or reaction products of these acids or of the nitrogen compound.

---

The electrolyte liquid is known from German patent specification 1,158,635. It can be used in a broad temperature range, for example, between −55 and +100° C.

It was found to be advantageous in relation to the risk of corrosion of the metal parts of the envelope when no water is added to the solvent during the preparation of such a capacitor electrolyte containing a multivalent alcohol as a solvent, two inorganic acids and one organic acid, and when the basic nitrogen compound is added to the electrolyte liquid with a low water content, for example, in the form of an at least 25% aqueous solution.

The basic nitrogen compound may alternatively be added to the electrolyte completely or partly in the form of one or more of its salts with the inorganic acids or with the organic acid.

Particularly satisfactory results are obtained when ammonia is used as a basic nitrogen compound.

These types of low-resistive electrolytes have, however, the drawback that they generate gas especially at high temperatures so that the residual current is increased and the sealing of the capacitor is jeopardized. A cause of this gas generation may reside in the fact that both the aluminium oxide coating serving as a dielectric on the anode and the coating on the negative electrode foil have a large number of pores extending at right angles to the base metal. The base metal consisting of aluminium is in contact through these pores with the electrolyte, and some of it dissolves thereby. As a result hydrogen is released at the cathode so that a pressure above atmospheric pressure is brought about in the capacitor.

Hydrogen is formed, for example, in accordance with the following equation:

$$2Al + 2H_3PO_4 \longrightarrow 2Al^{+++} + 2PO_4^{---} + 3H_2\nearrow$$

It was found that certain substances act as inhibitors because they inhibit or prevent the dissolution of the aluminium oxide coating.

Phenyl, glycol, alkyl, pyridine, furfuryl alcohol and/or compounds of hexavalent chromium are, inter alia, suitable as inhibitors. The prevention of gas generation which is achieved by addition of chromic acid or chromates surprisingly appears to be maintained for a very long period. An addition of ammonium chromate to the electrolyte is very suitable in this case. The compounds of hexavalent chromium may alternatively be added in the form of dichromates instead of in the form of chromates. The chromic acid or the chromates then do not form a chemical compound with the aluminium oxide coating; they are only absorbed particularly in the pores and thus form a coating which protects the base metal and also the oxide coating itself from dissolution.

It is known from German patent specification 935,804 to add chromates to operating electrolytes on the basis of boric acid and/or borates and multivalent alcohols. However, the inhibition of gas generation does not play a part in these uses, which is apparent from the fact that chromates rank with other oxygen-containing substances or substances easily releasing oxygen such as hydrogen peroxide, manganese dioxide, perborates and manganates.

Chromic acid and chromates are preferably used in quantities of from 0.05 to 0.5% by weight calculated on the electrolyte liquid. Particularly satisfactory results are obtained with low-resistive electrolytes of the following composition:

100–120 parts by weight of glycol
10–30 parts by weight of boric acid
40–70 parts by weight of ammonia (25%)
7–12 parts by weight of phosphoric acid
40–70 parts by weight of acetic acid
0–20 parts by weight of ammonium pentaborate
0.05–0.5% by weight of chromic acid or ammonium chromate.

The addition according to the invention may be effected to both the electrolyte for the preliminary formation of the anodes and to the operating electrolyte. In the latter case, both the anode and the cathode foils are protected from dissolution. In the cathode foils the added substances are absorbed by the ever present atmospheric oxygen coating or by the previously applied stabilisation coating.

The advantages of the addition according to the invention not only resides in the prevention of gas generation but also in a decrease of the leakage current, a considerable extension of the life of the capacitors, and an extension of the temperature range within which the capacitors can be used to higher temperatures, for example, +125° C. The capacitance of the capacitors is not influenced by the addition. The behaviour of the capacitors at low temperatures is usually slightly enhanced.

In order that the invention may be readily carried into effect, it will now be described in detail with reference to a few examples.

EXAMPLE 1

The following electrolytic liquid A for use in low-voltage capacitors up to 100 v. having aluminium electrodes for the temperature range of −40 to +85° C. was composed by mixing the components and boiling the mixture up to a temperature of 110° C.

| | Gms. |
|---|---|
| Ethylene glycol | 410 |
| Boric acid | 93 |
| Ammonia (25%) | 230 |
| Phosphoric acid | 35 |
| Acetic acid | 231 |
| Chromic acid (=0.1%) | 1 |

Electrolyte liquid B had the same composition, but chromic acid was not added.

Pieces of aluminium foil having a surface of 10 sq. cm. and being of different purity and surface quality were maintained immersed each time in 8 mls. of electrolyte liquid at 85° C., for 70 hours. The quantity of gas which had evolved after this period of time was measured in cm.³.

| Foil | Electrolyte | |
|---|---|---|
| | A | B |
| 99.99%, roughened | 0.1 | 4.7 |
| 99.5%, roughened and stabilized | 0.1 | 1.6 |

A comparison of these measuring results shows that the gas generation at the electrode foils for electrolyte A is only a small fraction, only approximately 2 to 6% of the quantity of gas in electrolyte B without the addition according to the invention. Purity and surface quality play an important part in this case.

EXAMPLE 2

The concentration of the chromic acid was varied as follows in the basic prescription of the electrolyte liquid B.

Electrolyte B: without chromic acid.
Electrolyte C: electrolyte B+0.05% of chromic acid.
Electrolyte D: electrolyte B+0.15% of chromic acid.

The following quantities of gas in cm.$^3$ were evolved during the test identical to the test of Example 1.

| Roughened Al foil | Electrolyte liquid | | |
|---|---|---|---|
| | B | C | D |
| 99.99% | 4.7 | 3.9 | 0.35 |
| 99.5% stabilized | 1.6 | 1.2 | 0.25 |

In both cases a decrease of the gas generation occurred due to addition of chromic acid. The optimum for this basic composition lies at 0.1% of chromic acid.

EXAMPLE 3

A quantity of 0.1% of ammonium chromate was added to the basic composition B (electrolyte E) and ammonium dichromate, (electrolyte F). The test according to Example 1 yielded the following gas generation in cm.$^3$.

| Roughened Al foil | Electrolyte liquid | | |
|---|---|---|---|
| | B | E | F |
| 99.99% | 4.7 | 2.6 | 2.3 |
| 99.5% stabilized | 1.6 | 1.3 | 0.8 |

Also the addition of ammonium chromate or ammonium dichromate reduces the quantity of generated gas. The quantity in percents by weight must, however, be higher than when adding chromic acid.

EXAMPLE 4

0.1% of alkyl pyridine was added to electrolyte B (electrolyte G.). In the case of roughened aluminium foil having a purity of 99.99%, 4.7 and 4.3 cm.$^3$ of gas were generated in the electrolytes B and G, respectively during the test according to Example 1. The gas generation is not as greatly suppressed by alkyl pyridine as by chromic acid or chromates.

EXAMPLE 5

It is true that a capacitor having an impregnated winding generates less gas than a recipient in which aluminium foils of the same dimensions, purity and surface quality are provided in a self-supporting manner, but also in this case the influence of the addition of chromic acid, chromates etc. is quite noticeable.

In capacitors of 50 μf., having an operating voltage of 70 v., 0.3 and 0.6 cm.$^3$ of gas were generated when using electrolytes A and B, respectively, after they had been preserved without voltage at 85° C., for 110 hours. This results in a longer lifetime for the capacitors of electrolyte A than for a capacitor of electrolyte B. The inhibiting action of the additions according to the invention is of course not bound to the specific examples described.

What is claimed is:

1. An electrolyte liquid for electrolytic capacitors consisting of a multivalent alcohol as a solvent, a basic nitrogen compound of low water content, two inorganic acids, one organic acid, reaction products of said acids, reaction products of the nitrogen compound or combinations thereof, said liquid including an inhibitor chosen from a compound of hexavalent chromium, phenyl glycol, alkyl pyridine or furfuryl alcohol, or combinations thereof.

2. An electrolyte liquid as claimed in claim 1 wherein said liquid contains alkali chromates, ammonium chromate, ammonium dichromates or combinations thereof.

3. An electrolyte liquid as claimed in claim 1 wherein chromic acid or chromates are present in a quantity of between 0.05 and 0.5% by weight.

4. An electrolyte liquid as claimed in claim 3 wherein the materials and proportions are:

100–120 parts by weight of glycol;
10–30 parts by weight of boric acid;
40–70 parts by weight of ammonia (25%);
7–12 parts by weight of phosphoric acid;
40–70 parts by weight of acetic acid;
0–20 parts by weight of ammonium pentaborate; and
0.05–0.5% by weight of chromic acid or ammonium chromate.

References Cited

UNITED STATES PATENTS

| 2,089,687 | 8/1937 | Clark et al. | 317—230 |
| 2,104,733 | 1/1938 | Brennan | 317—230 |
| 2,945,164 | 7/1960 | Taylor | 317—230 |
| 3,138,746 | 6/1964 | Burger | 317—230 |

JAMES D. KALLAN, Primary Examiner

U.S. Cl. X.R.

317—230